US010179291B2

(12) United States Patent
Thomas et al.

(10) Patent No.: US 10,179,291 B2
(45) Date of Patent: Jan. 15, 2019

(54) SESSION SPEECH-TO-TEXT CONVERSION

(71) Applicant: Microsoft Technology Licensing, LLC, Redmond, WA (US)

(72) Inventors: Evelyn R. Thomas, Bellevue, WA (US); Jason Kepner, Snoqualmie, WA (US); David Ruzyski, Kirkland, WA (US); Jeremy L. Dewey, Duvall, WA (US); Martin Hall, Sammamish, WA (US); Joshua R. McCammon, Redmond, WA (US); Kedar Hirve, Kent, WA (US); Stephen E. Giscombe, Seattle, WA (US); Travis St. Onge, Redmond, WA (US); Aaron Cardwell, Kirkland, WA (US); Matthew Labunka, Bellevue, WA (US); Luca Beltrami, Redmond, WA (US); Heather Grantham Brodie, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/491,818

(22) Filed: Apr. 19, 2017

(65) Prior Publication Data
US 2018/0161683 A1    Jun. 14, 2018

Related U.S. Application Data

(60) Provisional application No. 62/432,521, filed on Dec. 9, 2016.

(51) Int. Cl.
*A63F 13/87* (2014.01)
*H04L 12/58* (2006.01)
(Continued)

(52) U.S. Cl.
CPC .............. *A63F 13/87* (2014.09); *A63F 13/53* (2014.09); *G06F 3/013* (2013.01); *G06F 3/0481* (2013.01);
(Continued)

(58) Field of Classification Search
None
See application file for complete search history.

(56) References Cited

U.S. PATENT DOCUMENTS

| 6,183,367 B1 | 2/2001 | Kaji et al. |
| 7,203,648 B1 | 4/2007 | Ostermann et al. |

(Continued)

OTHER PUBLICATIONS

"API Reference: GameKit", https://developer.apple.com/reference/gamekit, Retrieved on: Oct. 27, 2016, 5 pages.
(Continued)

*Primary Examiner* — Damon Pierce
(74) *Attorney, Agent, or Firm* — Jacob P. Rohwer; Newport IP, LLC

(57) ABSTRACT

Examples described herein provide various devices that enable users to participate in a session. The examples allow a user that is unable to hear, or that is incapable of hearing, to participate in an in-session voice chat by receiving text messages that have been converted from speech to text (e.g., transcribed messages). The user enables a speech-to-text conversion feature on his or her own device. Based on the enabled feature, a notification can be sent to other devices participating in the session. Based on the notification, the other devices are tasked with capturing utterances and sending corresponding speech data to a speech-to-text conversion device so that voice communications can be converted to text messages. Subsequent to conversion, the text messages can be displayed in a chat interface presented as part of the displayed content for the session.

20 Claims, 11 Drawing Sheets

(51) Int. Cl.
*G06F 3/16* (2006.01)
*G06F 3/0484* (2013.01)
*G06F 3/01* (2006.01)
*G06F 3/0481* (2013.01)
*A63F 13/53* (2014.01)
*G06N 99/00* (2010.01)
*G10L 13/00* (2006.01)
*G10L 15/26* (2006.01)

(52) U.S. Cl.
CPC .......... *G06F 3/0484* (2013.01); *G06F 3/167* (2013.01); *G06N 99/005* (2013.01); *H04L 51/046* (2013.01); *A63F 2300/308* (2013.01); *A63F 2300/6072* (2013.01); *G10L 13/00* (2013.01); *G10L 15/26* (2013.01)

(56) References Cited

U.S. PATENT DOCUMENTS

| | | | |
|---|---|---|---|
| 8,825,642 | B2 | 9/2014 | Zatkin et al. |
| 9,227,140 | B2 | 1/2016 | Muller |
| 9,881,007 | B2 | 1/2018 | Orsini et al. |
| 2002/0069069 | A1 | 6/2002 | Kanevsky et al. |
| 2004/0267527 | A1 | 12/2004 | Creamer et al. |
| 2005/0159833 | A1 | 7/2005 | Giaimo et al. |
| 2006/0025214 | A1* | 2/2006 | Smith ............ A63F 13/12 463/30 |
| 2006/0203009 | A1 | 9/2006 | Nakajima et al. |
| 2007/0260984 | A1 | 11/2007 | Marks et al. |
| 2009/0063156 | A1 | 3/2009 | Squedin et al. |
| 2011/0092187 | A1 | 4/2011 | Miller |
| 2012/0110456 | A1* | 5/2012 | Larco ............ G06F 3/167 715/728 |
| 2013/0288777 | A1 | 10/2013 | Short et al. |
| 2014/0046891 | A1* | 2/2014 | Banas ............ G06N 5/022 706/46 |
| 2016/0140951 | A1 | 5/2016 | Agiomyrgiannakis et al. |
| 2017/0003740 | A1* | 1/2017 | Verfaillie ........... G06F 3/013 |
| 2017/0182426 | A1 | 6/2017 | Loeb et al. |
| 2017/0186418 | A1 | 6/2017 | Mairano et al. |

OTHER PUBLICATIONS

Cervantes, Edgar, "Google Text-to-speech adds multiple male and female voices", http://www.androidauthority.com/google-text-to-speech-multiple-male-female-voices-673214/, Published on: Feb. 13, 2016, 5 pages.

"In Game Chat for Deaf Players", http://us.battle.net/forums/en/wow/topic/20749266857, Retrieved on: Oct. 27, 2016, 3 pages.

"Discord", https://discordapp.com/, Retrieved on: Oct. 27, 2016, 1 pages.

Woollaston, Victoria, "The app that lets deaf people 'hear' phone calls: Pedius converts speech to text in real time", http://www.dailymail.co.uk/sciencetech/article-2965063/The-app-lets-deaf-people-hear-phone-calls-Pedius-converts-speech-text-real-time.html, Published on: Feb. 2015, 17 pages.

Mahini, Ladan, "Deaftel Makes Phone Conversations a Reality for the Deaf", https://www.twilio.com/blog/2012/03/deaftel-makes-phone-conversations-a-reality-for-the-deaf.html, Published on: Mar. 28, 2012, 6 pages.

Soltani, et al., "Developing a gesture-based game for deaf/mute people Using microsoft Kinect", In Proceedings of Sixth International Conference on Complex, Intelligent, and Software Intensive Systems, Jul. 4, 2012, pp. 494-495.

Lomas, Natasha, "Telegram levels up its bot platform with competitive games that live inside chats", https://techcrunch.com/2016/10/03/telegram-levels-up-its-bot-platform-with-competitive-games-that-live-inside-chats/, Published on: Oct. 3, 2016, 9 pages.

"Non Final Office Action Issued in U.S. Appl. No. 15/491,854", dated May 4, 2018, 14 Pages.

"Final Office Action Issued in U.S. Appl. No. 15/491,854", dated Sep. 11, 2018, 16 Pages.

\* cited by examiner

SESSION SPEECH-TO-TEXT CONVERSION

PRIORITY APPLICATION

This application claims the benefit of and priority to U.S. Provisional Application No. 62/432,521, filed Dec. 9, 2016, the entire contents of which are incorporated herein by reference.

BACKGROUND

A multiplayer session provides players of a video game with the ability to compete against other players either individually or in a team setting. Existing systems and services can provide functionality for a group of players participating in a multiplayer session to audibly communicate with one another using an in-session voice "chat" service. However, a player may be unable to, or the player may be incapable of, using voice to communicate with the other players participating in the multiplayer session. For example, a player may have a disability such that the player is incapable of hearing (e.g., the player is deaf or has a hearing impairment). In another example, a player may be playing a video game in a quiet location where voice communications audibly output by a device speaker will disrupt other people close to the player (e.g., the quiet location may be a library where others are quietly reading or a room where an infant or a small child has fallen asleep, etc.). Without the ability and/or capability to hear what the other players are saying via the use of the in-session voice chat service, the player can be disconnected from the complete gaming experience.

SUMMARY

This disclosure describes systems and techniques that allow participants in a multiplayer session that are unable to hear (e.g., a player in a quiet location) or that are incapable of hearing (e.g., a player with a hearing impairment) to still participate in voice chat during the multiplayer session. A multiplayer session can be provided and/or hosted by resources (e.g., program code executable to generate game content, devices such as a server, networking functionality, etc.) developed and/or operated by a title. Thus, the title can comprise resources related to a developer and/or a publisher of a multiplayer game, for example. Further, the multiplayer session can be executed on computing devices in order to allow users to participate in the multiplayer session. The computing devices can comprise "platform" components that are configured to generate and render platform content (e.g., chat functionality) that can enhance a session experience for a participant while the participant engages with the game content provided by the title (e.g., a player plays a game). Accordingly, session content displayed in a user interface of a display screen can include game content provided by a tile and platform content provided by a device on which the game content is being displayed. In various examples described herein, program code of a title executable to generate the game content is configured to access and use (e.g., via an application programming interface (API)) functionality of a platform component (e.g., an in-session voice chat component) so that the participants in the multiplayer session can exchange voice communications with one another. Accordingly, in some implementations, the techniques described herein can be implemented in part or in full by an in-session voice chat component.

As described herein, a participant who wants to chat with other participants but who is unable to hear, or who is incapable of hearing, voice communications from other participants in the multiplayer session provides input to enable a speech-to-text (STT) conversion feature. A notification of the enabled STT conversion feature is sent to the devices of the other participants in the multiplayer session so that utterances spoken by the other participants can be captured, sent as speech data to a conversion device, and converted into text messages. Accordingly, in addition to, or in some cases instead of, receiving and outputting utterances spoken by the other participants, the device of the participant who is unable to hear or who is incapable of hearing voice communications receives and displays text messages (e.g., transcribed messages) that have been converted from speech to text. For instance, the text messages can be displayed in a chat interface (e.g., a chat window) that is displayed along with other session content (e.g., game content) in a user interface on a display screen. This allows the participant to see communications in addition to, or rather than, hearing the communications.

In the context of multiplayer sessions, the chat content (e.g., the text messages displayed in the chat interface) is most likely not the primary content being consumed by a participant over a period of time. Rather, a participant's focus (e.g., eye gaze) over a period of time is mostly directed to viewing or interacting with the game content (e.g., shooting an enemy in a war game, scoring a point in a sports game, selecting a session menu option, viewing session statistics, etc.) and the participant's focus may intermittently be directed to the chat content (e.g., when a text message is received, during a break or downtime in the session, etc.). Therefore, the chat content is considered to be supplemental content to the primary session content, and the session experience for a participant comprises a multi-tasking experience due to the participants engagement with game content and chat content over a period of time. The techniques and systems described herein are configured to intelligently position the chat interface within the larger session user interface to avoid obstructing the participant's focus on the primary session content (e.g., the game content).

In one example, the game content is rendered and/or provided by first resources (e.g., program code executable to generate game content, devices such as a server, networking functionality, etc.) developed and/or operated by a title and the chat interface is separately rendered and/or provided by second resources (e.g., a platform component of a device such as a game console on which the multiplayer session is being executed). In this example, the chat interface can be rendered as part of an overlay layer on top of the separately rendered game content. Since viewing the chat interface is likely secondary to viewing the primary game content over a period of time, the chat interface can be displayed in a selected position of the overlay layer that is outside of a focus area of the user interface that presents the game content, where the focus area is determined to be associated with a participant's eye gaze based on the game content being displayed. This can reduce or eliminate interference with the game content. The selected position can be one of a predetermined number of preconfigured positions in the overlay layer, and the position can change as the focus area changes over a period of time.

In another example, the game content and the chat content (e.g., the chat interface) can both be rendered by the title such that a custom chat interface is embedded within the game content. In this example, one or more application program interfaces can be used to make the title aware of a received text message to be displayed so that the title can render the text message in a custom chat interface embedded in the game content.

As described above, a device on which the STT conversion feature is enabled provides a notification of the enabled STT conversion feature to other devices of the other participants in the multiplayer session. Upon receiving the notification of the enabled STT conversion feature, the other devices (e.g., in-session voice chat components of the other devices) are configured to capture utterances spoken by the other participants and send corresponding speech data (e.g., audio clips and/or packets) to a STT conversion device. In this scenario, the other devices are responsible for interacting with a STT conversion service to have speech data converted to text data. Consequently, the load (e.g., computational resources, storage resources, networking resources) associated with the conversion is spread across multiple client devices rather than one device (e.g., the device associated with the participant with the disability). The STT conversion device subsequently converts the received speech data into text data. In some examples, the STT conversion device returns the text data to the individual devices from which the speech data was originally received, and thus, the individual devices then send the text data to the device for which the STT conversion feature was enabled. In alternative examples, the STT conversion device can send the text data directly to the device for which the STT conversion feature was enabled. As described herein, the STT conversion service can be provided within a system that hosts and provides multiplayer session content, or alternatively, the STT conversion service can be provided by a separate system (e.g., a third-party system) that is not part of a system that hosts and provides multiplayer session content.

In various examples described herein, the STT conversion device determines, or is informed of, a title of the multiplayer session. Based on the title, the STT conversion device can access a conversion model that converts speech to text using a dictionary of known utterances that are specific to the title. Stated another way, the dictionary can include words and/or phrases that are commonly spoken by participants while participating in a multiplayer session of the title. The STT conversion device can generate and/or update the conversion model using machine learning techniques as speech data is received over time. Use of the conversion model and/or the dictionary that is specific to a title enables more efficient and more accurate conversion of speech to text (e.g., it reduces that latency associated with the conversion, decreases the likelihood of misspelled words and/or incorrect punctuation, etc.).

In the context of multiplayer sessions, many participants interact with other participants they do not even know, and thus, many participants do not want to be inconvenienced to accommodate a disability of another person. An example of an inconvenient accommodation is to require other participants to input a "chat" communication as text rather than speech. Accordingly, the enablement of the STT conversion feature described herein alters the voice chat experience of one participant using one device but does not severely impact the voice chat experiences of the other participants using the other devices. While the other devices may have to perform some functions to have speech data converted to text messages, the participants that do not have the hearing disability that needs to be accommodated are not required to change the way in which they use the in-session voice chat functionality during a multiplayer session (e.g., there is no need to change voice input to text input).

Furthermore, the systems and techniques described herein may prohibit, for participant privacy purposes, the other devices from outputting (e.g., displaying) information related to the STT conversion feature enabled for a participant. That is, the other devices may be prohibited from explicitly notifying their respective users of the enabled STT conversion feature. Instead, the STT functionality is implemented in the background by the devices participating in the multiplayer session and the other participants are unaware of the STT conversion.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Examples described herein provide various devices that enable users to participate in a multiplayer session. The examples allow a user that is unable to hear, or that is incapable of hearing, to participate in an in-session voice chat by receiving messages that have been converted from speech to text (e.g., transcribed messages). The user enables a speech-to-text conversion feature on his or her own device. Based on the enabled feature, a notification can be sent to other devices participating in the multiplayer session. Based on the notification, the other devices are tasked with capturing utterances and sending corresponding speech data to a speech-to-text conversion device so that voice communications can be converted into text messages. Subsequent to conversion, the text messages can be displayed in a chat interface presented in association with game content.

As described above, existing voice chat functionality implemented in association with multiplayer sessions is unable to accommodate a person with a hearing impairment or a person located in a quiet area. Various examples, scenarios, and aspects described below with reference to FIGS. 1-11 accommodate a person with a hearing impairment or a person located in a quiet area by converting speech data into text data.

Figure 1:
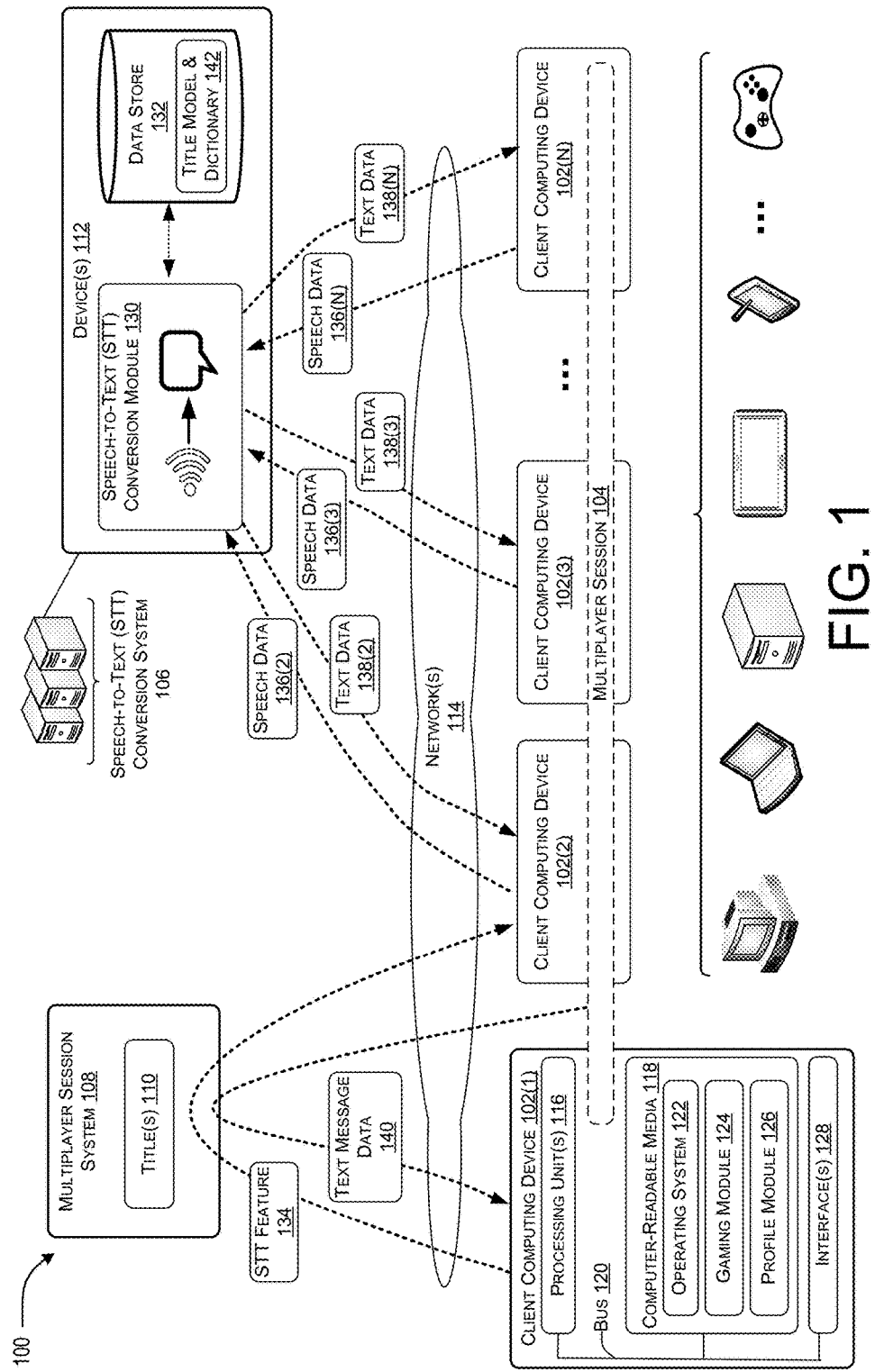
FIG. 1 is a diagram illustrating an example environment in which a client computing device participating in a multiplayer session can enable a feature that causes a speech-to-text conversion system to convert speech to text so a user of the client computing device can receive textual message data in addition to or rather than speech data from other client computing devices participating in the multiplayer session.

FIG. 1 is a diagram illustrating an example environment 100 in which a client computing device 102(1) participating in a multiplayer session 104 can enable a feature that causes a speech-to-text conversion system 106 (e.g., a speech-to-text conversion service) to convert speech data to text data so a user (e.g., may be referred to herein as a participant and/or player) of the client computing device 102(1) can receive text messages in addition to or rather than receiving voice communications from the other client computing devices 102(2) . . . 102(N) participating in the multiplayer session 104 (where N is a positive integer number such as two, three, four, five, ten, fifteen, twenty, fifty, one hundred, and so forth).

The client computing devices 102(1) . . . 102(N) enable their respective users to participate, individually or as a team, in the multiplayer session 104. The multiplayer session 104 can be hosted, over a network, by a multiplayer session system 108 (e.g., PLAYSTATION NOW, NINTENDO NETWORK, XBOX LIVE, etc.). In some examples, the multiplayer session system 108 can provide game content based on various title(s) 110 so that users of the client computing devices 102(1) . . . 102(N) can participate in the multiplayer session 104. As mentioned above, a title 110 can comprise resources (e.g., program code, devices, networking functionality, etc.) useable to execute the multiplayer session 104 across the client computing devices 102(1) . . . 102(N). A title 110 can be associated with an action game, a fighting game, a war game, a role playing game, a strategy game, a racing game, a sports game, or the like. In some implementations, a title 110 may operate the multiplayer session system 108. As an alternative and in accordance with a title 110, the multiplayer session 104 can be hosted by one of the client computing devices 102(1) . . . 102(N) without a multiplayer session system 108 (e.g., via peer-to-peer network communications).

The speech-to-text (STT) conversion system 106 comprises device(s) 112 that provide a service that converts speech data to text data. The device(s) 112 and/or other components of the STT conversion system 106 can include distributed computing resources that communicate with one another, with the multiplayer session system 108, and/or with the client computing devices 102(1) . . . 102(N) via one or more network(s) 114. Network(s) 114 can include, for example, public networks such as the Internet, private networks such as an institutional and/or personal intranet, or some combination of private and public networks. Network(s) 114 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 114 can utilize communications protocols, including packet-based and/or datagram-based protocols such as internet protocol (IP), transmission control protocol (TCP), user datagram protocol (UDP), or other types of protocols. Moreover, network(s) 114 can also include a number of devices that facilitate network communications and/or form a hardware basis for the networks, such as switches, routers, gateways, access points, firewalls, base stations, repeaters, backbone devices, and the like.

In some examples, network(s) 114 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In various examples, device(s) 112 can include one or more computing devices that operate in a cluster or other grouped configuration to share resources, balance load, increase performance, provide fail-over support or redundancy, or for other purposes. For instance, device(s) 112 can belong to a variety of classes of devices such as traditional server-type devices, desktop computer-type devices, and/or mobile-type devices. Thus, although illustrated as a single type of device—a server-type device—device(s) 112 can include a diverse variety of device types and are not limited to a particular type of device. Device(s) 112 can represent, but are not limited to, server computers, desktop computers, web-server computers, personal computers, mobile computers, laptop computers, tablet computers, or any other sort of computing device.

A client computing device (e.g., one of client computing device(s) 102(1) . . . 102(N)) can belong to a variety of classes of devices, which can be the same as, or different from, device(s) 112, such as traditional client-type devices, desktop computer-type devices, mobile-type devices, special purpose-type devices, embedded-type devices, and/or wearable-type devices. Thus, a client computing device can include, but is not limited to, a game console, a desktop computer, a gaming device, a tablet computer, a personal data assistant (PDA), a mobile phone/tablet hybrid, a laptop computer, a telecommunication device, a computer navigation type client computing device such as a satellite-based navigation system including a global positioning system (GPS) device, a wearable device, a virtual reality (VR) device, an augmented reality (AR) device, an implanted computing device, an automotive computer, a network-enabled television, a thin client, a terminal, an Internet of Things (IoT) device, a work station, a media player, a personal video recorders (PVR), a set-top box, a camera, an integrated component (e.g., a peripheral device) for inclusion in a computing device, an appliance, or any other sort of computing device. In some implementations, a client computing device includes input/output (I/O) interfaces that enable communications with input/output devices such as user input devices including peripheral input devices (e.g., a game controller, a keyboard, a mouse, a pen, a voice input device, a touch input device, a gestural input device, and the like) and/or output devices including peripheral output devices (e.g., a display screen, a printer, audio speakers, a haptic output device, and the like).

Client computing device(s) 102(1) . . . 102(N) of the various classes and device types can represent any type of computing device having one or more processing unit(s) 116 operably connected to computer-readable media 118 such as via a bus 120, which in some instances can include one or more of a system bus, a data bus, an address bus, a PCI bus, a Mini-PCI bus, and any variety of local, peripheral, and/or independent buses.

Executable instructions stored on computer-readable media 118 can include, for example, an operating system 122, a gaming module 124, a profile module 126, and other modules, programs, or applications that are loadable and executable by processing units(s) 116.

Client computing device(s) 102(1) . . . 102(N) can also include one or more interface(s) 128 to enable communications between client computing device(s) 102(1) . . . 102(N) and other networked devices, such as device(s) 112 and/or devices of the multiplayer session system 108, over network(s) 114. Such interface(s) 128 can include one or more network interface controllers (NICs) or other types of transceiver devices to send and receive communications and/or data over a network.

In the example environment 100 of FIG. 1, client computing devices 102(1) . . . 102(N) can use their respective gaming module 124 to connect with one another and/or other external device(s) in order to participate in the multiplayer session 104. For instance, a player can utilize a client computing device 102(1) to access resources associated with a title 110. When executing the title 110, the player can select a multiplayer mode, which can cause the client computing device 102(1) to connect to a session hosting device and/or other client computing devices 102(2) . . . 102(N) over the network 114. The player can then use the client computing device 102(1) to register as a player, and/or as a member of a team, view and/or play in the multiplayer session 104, and receive updates and/or results for the multiplayer session 104.

Accordingly, the client computing device(s) 102(1) . . . 102(N) can use their respective profile modules 126 to generate participant profiles and to provide shareable information (e.g., non-private information authorized to be shared) of the participant profiles to other client computing devices, to session hosting devices, and/or to the device(s) 112 of the STT conversion system 106. A participant profile can include one or more of an identity of a participant (e.g., a unique identifier such as a "gamer" tag or a participant tag, a name, etc.), a skill level of the participant, a rating for the participant, an age of the participant, a friends list for the participant, a location of the participant, etc. Participant profiles can be used to register participants for multiplayer sessions. In some examples, the STT conversion system 106 and/or the multiplayer session system 108 maintain profile information (e.g., participant identity, skill, rating, etc.) and can provide, upon request and in accordance with privacy settings, some of the profile information to clients and/or services as required and as authorized.

As illustrated in FIG. 1, the device(s) 112 of the STT conversion system 106 comprise a speech-to-text (STT) conversion module 130 and a data store 132. As described above, a participant using client computing device 102(1) to play the multiplayer session 104 may have a disability that affects his or her ability to hear voice chat communications. Or, the participant may be located in a quiet area where audible noise will distract others. Accordingly, the gaming module 124 allows the participant to enable a STT conversion feature 134 for the multiplayer session 104. For instance, enablement of the STT conversion feature 134 may inform an in-session voice chat component of a participant's inability or incapability of hearing voice communications. In various examples, the in-session voice chat component can be a "platform" component of the gaming module 124 and/or the operating system 122 that is called upon by the program code of the title (e.g., via an API) to provide voice chat communications during the multiplayer session 104.

The client computing device 102(1) then sends a notification of the STT conversion feature 134 to the multiplayer session system 108 and/or to the other client computing devices 102(2) . . . 102(N). Upon receiving the notification of the STT conversion feature 134, the other client computing devices 102(2) . . . 102(N) and/or their corresponding in-session voice chat components are configured to capture utterances and send corresponding instances of speech data 136(2) . . . 136(N) to the STT conversion system 106. The STT conversion module 130 of the STT conversion system 106 is configured to receive, from individual client computing devices 102(2) . . . 102(N), the instances of speech data 136(2) . . . 136(N) and convert the speech data 136(2) . . . 136(N) into text data. Once converted, the STT conversion module 130 returns separate instances of text data 138(2) . . . 138(N) to the client computing devices 102(2) . . . 102(N) from which the corresponding instances of speech data 136(2) . . . 136(N) were initially received. Therefore, the client computing devices 102(2) . . . 102(N) are individually configured to send, to the client computing device 102(1) for which the STT conversion feature 134 is enabled, the text data 138(2) . . . 138(N). Stated another way, utterances captured at any one of client computing devices 102(2) . . . 102(N) can be converted to text and sent to the client computing device 102(1) as text message data 140 so the user of the client computing device 102(1) can participate in the in-session voice chat by viewing the text messages in a chat interface. In this scenario, a large part of the resource load required for the conversion of all of the speech data 136(2) . . . 136(N) is distributed amongst various devices participating in the multiplayer session 104 as opposed to the client computing device 102(1) receiving all the voice communications and bearing the resource load to subsequently convert all the speech data 136(2) . . . 136(N) into text alone.

In one example, the other client computing devices 102(2) . . . 102(N) are configured to wait until a speech data packet is completely filled before transmitting the packet to the STT conversion system 106. However, in an alternative example and to reduce latency, the other client computing devices 102(2) . . . 102(N) can be configured to transmit speech data in real-time (e.g., independent of whether a packet is completely filled).

In various examples further described herein, the chat interface is rendered by a platform component of the client computing device 102(1) in an overlay layer presented on top of the game content which is rendered by a title 110. In alternative examples, the chat interface and the game content are both rendered by the title such that the chat interface is embedded in the game content.

The STT conversion module 130 is configured to access a model and a dictionary 142 based on a specific title associated with the multiplayer session 104. For instance, a conversion model can be used to convert speech to text using a dictionary of known utterances that are specific to the title. The STT conversion module 130 can generate and/or update the conversion model using machine learning techniques as the utterances are received and converted over a period of time.

In some instances, the conversion module 130 and the title model and dictionary 142 can be maintained on individual client computing devices (e.g., 102(2) . . . 102(N)) such that the conversion of the speech to text (e.g., the transcription service) happens on the client computing device rather than the devices of the STT conversion system 106. In this scenario, no network communications are required for the conversion.

Figure 2:
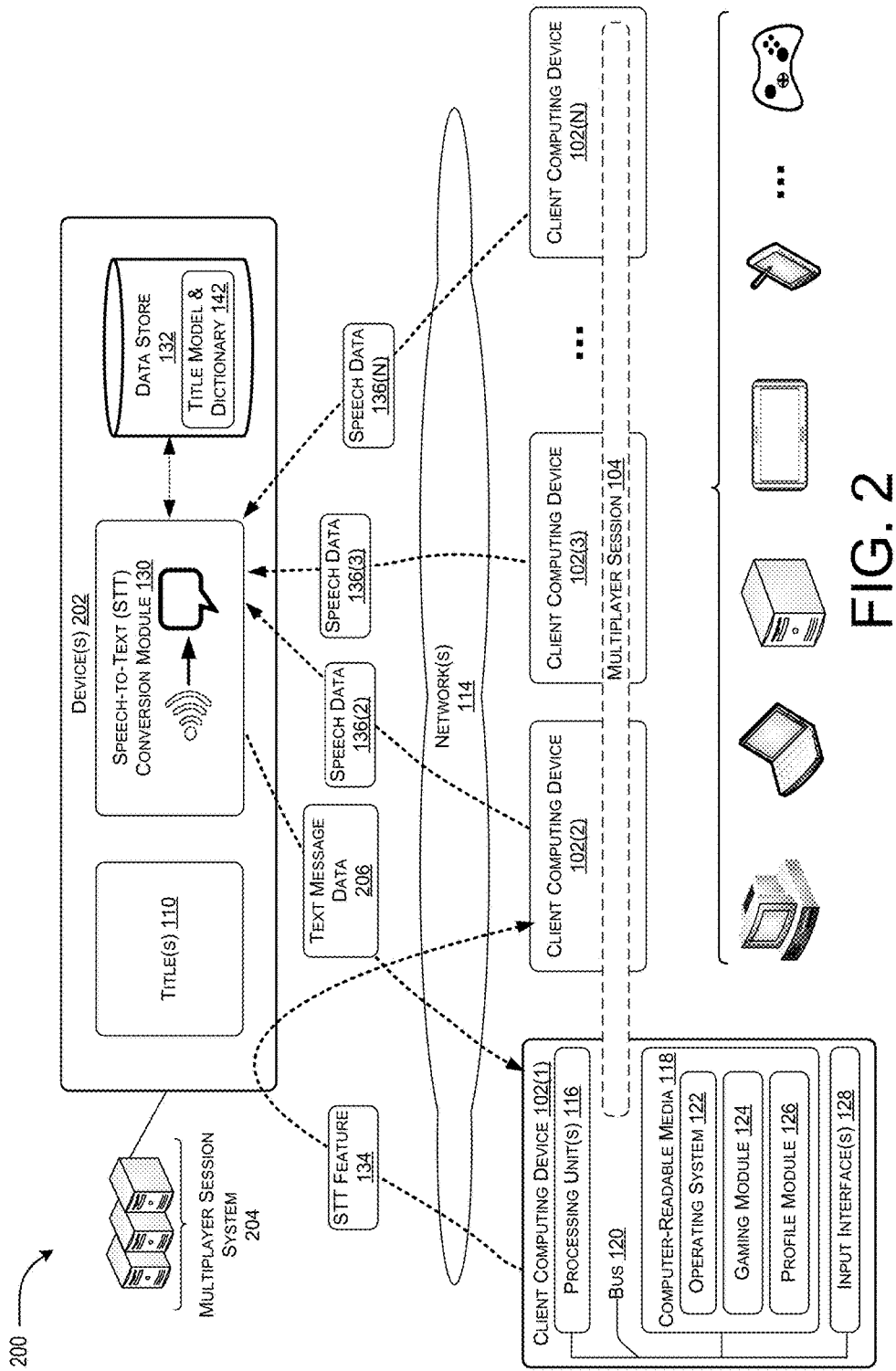
FIG. 2 is a diagram illustrating another example environment in which a client computing device participating in a multiplayer session can enable a feature that causes a speech-to-text conversion system to convert speech to text so a user of the client computing device can receive textual message data in addition to or rather than speech data from other client computing devices participating in the multiplayer session.

FIG. 2 is a diagram illustrating another example environment 200 in which a client computing device 102(1) participating in a multiplayer session 104 can enable a feature that causes a speech-to-text conversion system 106 to convert speech to text so a user of the client computing device 102(1) can receive textual message data in addition to or rather than speech data from other client computing devices 102(2) . . . 102(N) participating in the multiplayer session 104.

The difference in the environment 200 of FIG. 2 compared to the environment 100 of FIG. 1 is that the STT conversion module 130 is part of or operated in association with devices 202 of the multiplayer session system 204. Accordingly, client computing devices 102(2) . . . 102(N) are still notified of the enabled STT feature 134 and the client computing devices 102(2) . . . 102(N) still capture utterances and send corresponding instances of speech data 136(2) . . . 136(N) to the STT conversion module 130. However, rather than send text data back to the client computing devices 102(2) . . . 102(N), the STT conversion module 130 sends the text message data 206 directly to client computing device 102(1). The text message data 206 can be sent along with other session content (e.g., game content) provided by the multiplayer session system 204.

Figure 3:
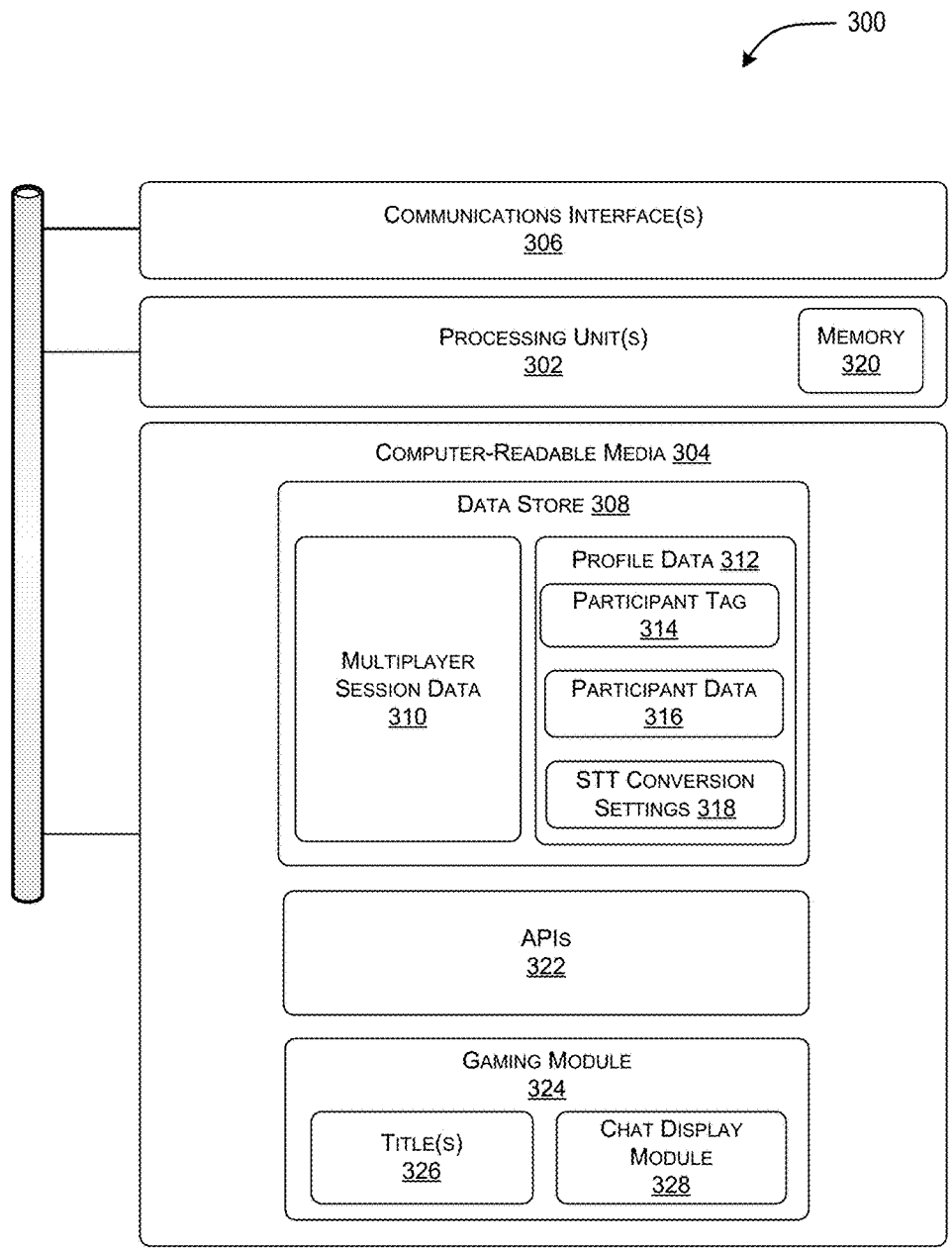
FIG. 3 is a diagram illustrating components of an example device configured to receive textual messages that have been converted from speech to text and/or render a chat interface to display text messages.

FIG. 3 is a diagram illustrating components of an example device 300 configured to render session content (e.g., game content and/or a chat interface that presents the textual messages as chat content after the STT conversion). The example device 300 can be a client computing device (e.g., 102(1)), a device of multiplayer session system 108, or a device 202 of multiple player session system 204. In some instances, the components illustrated in FIG. 3 can be spread across various ones of the devices described herein.

Device 300 includes one or more processing unit(s) 302, computer-readable media 304, communication interface(s) 306. The components of device 300 can be operatively connected, for example, via a bus, which can include one or more of a system bus, a data bus, an address bus, a PCI bus, a Mini-PCI bus, and any variety of local, peripheral, and/or independent buses.

As used herein, processing unit(s), such as processing unit(s) 302, processing unit(s) 116, and/or processing unit(s) of other devices (e.g., devices 112), can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

As used herein, computer-readable media, such as computer-readable media 304, computer-readable media 118, and/or computer-readable media of other devices (e.g., devices 112), can store instructions executable by the processing unit(s). Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 306 can represent, for example, network interface controllers (NICs) or other types of transceiver devices to send and receive communications over a network.

In the illustrated example, computer-readable media 304 can include a data store 308. In some examples, a data store includes data storage such as a database, data warehouse, or other type of structured or unstructured data storage. In some examples, a data store includes a corpus and/or a relational database with one or more tables, indices, stored procedures, and so forth to enable data access including one or more of hypertext markup language (HTML) tables, resource description framework (RDF) tables, web ontology language (OWL) tables, and/or extensible markup language (XML) tables, for example.

Data store 308 can store data for the operations of processes, applications, components, and/or modules stored in computer-readable media 304 and/or executed by processing unit(s) 302 and/or accelerator(s). For instance, in some examples, data store 308 can store multiplayer session data 310 and/or profile data 312. The multiplayer session data 310 can comprise a total number of participants in the multiplayer session 104, a mode or category of the title, activity that occurs in the multiplayer session 104 (e.g., behavior, maneuvers, earned points or a score, and/or achievements of the participants), and/or other data related to when and how the multiplayer session 104 is executed or hosted.

Examples of profile data 312 include, but are not limited to, a participant identity (ID) such as a participant tag 314 (e.g., a gamer tag that may keep the player anonymous), participant data 316 (e.g., skill level, performance data, etc.), and speech-to-text (STT) conversion settings 318. For example, a STT conversion setting 318 can be universally enabled for any game title. In another example, a player may be required to enable the STT conversion setting 318 upon entry into each multiplayer session. In some instances, the STT conversion settings 318 can be user-defined characteristics for the chat interface (e.g., font size, width/height dimensions of the chat interface, inactivity timer, ability to move the chat interface within the user interface, ability to minimize/maximize the chat interface, display of icons to visually distinguish between input modes, etc.).

In various examples, before a participant engages in an in-session voice chat experience with other participants of the multiplayer session 104, the participant's privilege and privacy restrictions can be checked to determine banned or blocked participants.

As an alternative, some or all of the above-referenced data can be stored on separate memories 320 on board one or more processing unit(s) 302 such as a memory on board a CPU-type processor, a GPU-type processor, an FPGA-type accelerator, a DSP-type accelerator, and/or another accelerator.

In the illustrated example of FIG. 3, computer-readable media 304 also includes application programming interface(s) (APIs) 322. At least one API is configured to expose the voice chat functionality to, for example, the gaming module 324 (e.g., gaming module 124) executing the multiplayer session 104 and/or program code of the titles 326 (e.g., titles 110). Additionally, computer-readable media 304 includes a chat display module 328 (which may be part of the gaming module 324). The chat display module 328 can be a platform component that is configured to cause a chat interface to be presented on a display screen (e.g., a display screen associated with client computing device 102(1)) within with a larger user interface that contains the game content. In some instances, the chat display module 328 and/or other platform components can be part of an operating system (e.g., operating system 122).

In one example, the chat display module 328 is configured to generate an overlay layer that is presented on top of (e.g., over) the game content which is rendered by program code of a title 326. In this example, the overlay layer is a generic overlay layer that can be called upon by any title 326 (e.g., via an API 322) to configure and display the chat interface, which includes the converted textual messages. In one implementation, the chat display module 328 determines a position for the chat interface within the overlay layer independent of any interaction with or input from the title 326. In an alternative implementation, the title 326 is configured to be notified of a converted text message to be displayed via the chat interface and the title 326 is configured to select a position for the chat interface within the overlay layer. Benefits to using the platform provided overlay layer approach to display the chat interface include: (i) consistency across various titles based on a predetermined number of preconfigured positions in which the chat interface can be displayed as further described herein with respect to FIG. 4, and (ii) individual titles can avoid further development and designs costs associated with displaying a custom chat interface.

In another example, the title 326 can cause the chat interface to be displayed as embedded content within game content. In this example, the title 326 is configured to be notified of a text message to be displayed via the chat interface and the title 326 renders both the chat content and the game content together (e.g., an approach to displaying a custom chat interface). Thus, rather than display the chat interface in an overlay layer on top of the game content, the chat interface can be integrated within the game content by the title 326. Benefits to using the custom approach to display the chat interface include: (i) an ability for a title to position the chat interface to accommodate its players' specific needs, based on screen objectives, and chat behavior, and (ii) the ability for a title to provide custom options with respect to the chat interface for an improved experience.

The number of illustrated modules is just an example, and the number can vary higher or lower. That is, functionality described herein in association with the illustrated modules can be performed by a fewer number of modules or a larger number of modules on one device or spread across multiple devices.

Figure 4:
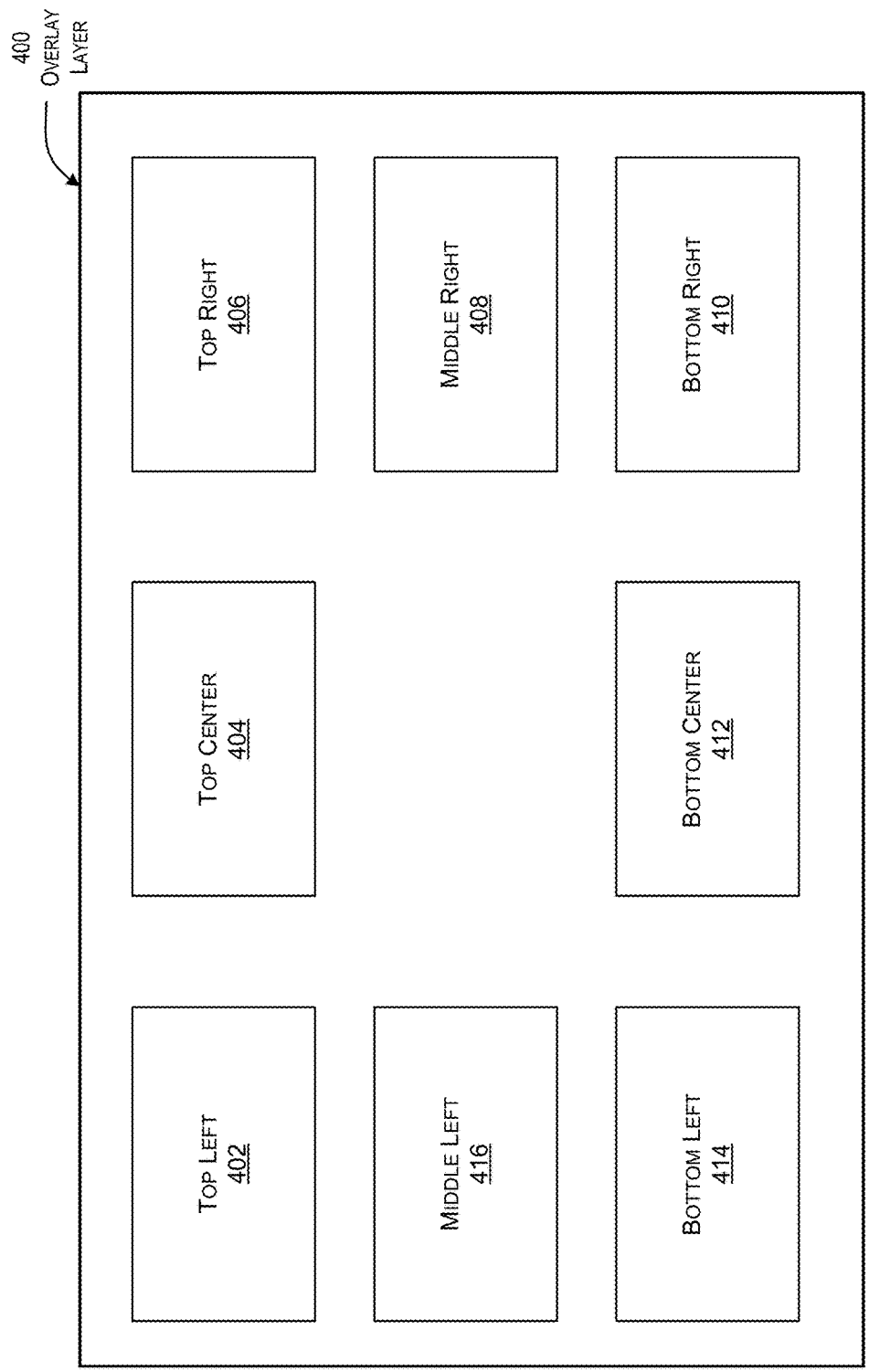
FIG. 4 is an example that illustrates a predetermined number of preconfigured positions of an overlay layer, any one of which can be selected to display the chat interface that includes chat content (e.g., text messages) that has been converted from speech to text.

FIG. 4 is an example that illustrates a predetermined number of preconfigured positions of an overlay layer 400, any one of which can be selected to display the chat interface that includes text messages that have been converted from speech to text. As described above, the overlay layer 400 rendered by an independent chat display module 328 is displayed on top of the game content rendered by a title 326. In this example, the predetermined number comprises eight. That is, the preconfigured positions include a top left position 402, a top center position 404, a top right position 406, a middle right position 408, a bottom right position 410, a bottom center position 412, a bottom left position 414, and a middle left position 416. The positions are preconfigured in the sense that they are laid out in advance and are of a particular size (e.g., set distance or pixel height, set distance or pixel width, a predetermined distance or number of pixels from side of display screen, a predetermined distance or number of pixels from top of display screen, a predetermined distance or number of pixels from bottom of display screen, a predetermined distance or number of pixels between positions etc.). In various examples, a dimension (e.g., height or width) of a position is predetermined based on a size of the display screen being used to display the session content.

As described above, one of the goals when positioning and displaying the chat interface over the game content is to not obstruct user interaction with the game content, or at least to select a position that causes the least amount of obstruction to relevant game content (e.g., avoid inhibiting interaction areas, avoid covering up critical game details, etc.). Accordingly, in the example of FIG. 4, there is at least eight different positions that can be selected, but there is no ninth position at the center of the overlay layer 400 because this is likely an area of the user interface that persistently displays relevant game content that should not be obstructed (e.g., a menu option, game space directly in front of the player, etc.). For example, in a shooting game, the space in the middle of the display screen is often where the player is aiming (e.g., to shoot an enemy).

In various examples, the chat display module 328 can select a position at which to display the chat interface in the overlay layer 400 without input from the title 326. For instance, the chat display module 328 can analyze the game content being displayed and determine a focus area of the user interface that is attracting the user's eye gaze. The chat display module 328 can then select a position for the chat interface within the overlay layer 400 that is outside the focus area. In a more specific example, the chat display module 328 can analyze the game content and determine movement is occurring toward the left side of the user interface or the display screen (e.g., enemies are running into a building on the left side of the screen). This can be determined to be an area of focus for the user, and as a result, the chat display module 328 can select a position on the right side of the user interface or the display screen (e.g., the top right position 406, the middle right position 408, or the bottom right position 410) in which the chat interface can be displayed because there is little or no game content movement on the right side (e.g., the game content on the right side is deemed to be less relevant than the game content on the left side). Other game content considerations analyzed when selecting a position can include different stages of a session (e.g., display of menu options, a particular game level being played, end-of-game results and statistics, etc.). Thus, some of the positions may be preferable over others based on which stage a session is currently in.

In further examples, eye gaze detection techniques and components can be used to determine the location on the display screen where a user is focused on (e.g., determine direction of eye gaze).

In various examples, the overlay layer 400 can be removed (e.g., faded) from overlaying the chat content on top of the game content after a predetermined inactivity time period expires with no communications (e.g., no received text messages). The removal is implemented to prevent the chat interface from obstructing the game content, and to prevent stale messages (e.g., from a previous competitive round) from persisting on the display screen.

Figure 5:
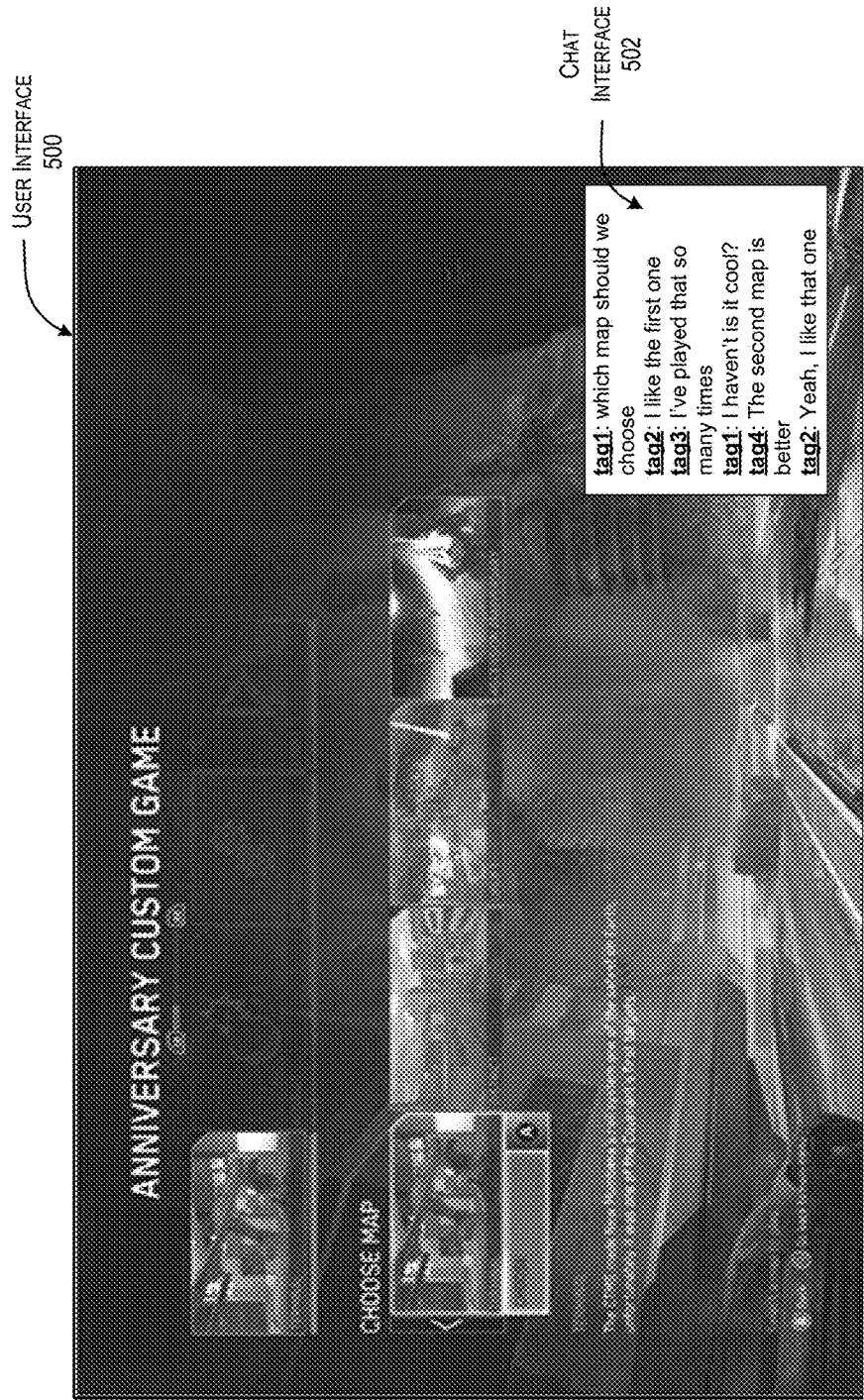
FIG. 5 is an example of a user interface that presents the game content along with a chat interface that contains text messages that have been converted from speech to text.

FIG. 5 is an example of a user interface 500 that presents the game content on a display screen along with a chat interface 502 that contains text messages that have been converted from speech to text. The text messages can be organized and/or presented in accordance with a timestamp (e.g., when they are received). In some instances, a filter can identify derogatory or bad words and remove them from the text messages. In further instances, a translation service can translate voice communications in one language to text in a different language (e.g., based on a user-defined setting). The chat interface 502 can be presented via a selected position of the overlay layer 400 of FIG. 4 (e.g., bottom right position 410) so that it does not obstruct user interaction with the menu items being displayed.

The chat interface 502 illustrates text messages being provided by gamer "tag1", gamer "tag2", gamer "tag3", and gamer "tag4". In various examples, the chat interface 502 is auto-scrolling such that when a new text message is received it is added at the bottom of the window and may push an older message out the top of the window so it is no longer viewable. In some implementations, the chat interface can be formatted so that participant interaction is prohibited (e.g., not possible). This will minimize interference with the game content and avoid a situation where a player accidentally performs an interaction with the chat interface rather than an interaction with the game content (e.g., an enemy player moves behind the chat interface on the display screen). Moreover, since the chat interface represents a real voice conversation, the participant may be prohibited from scrolling back in the chat interface to view missed messages that are no longer being displayed.

Figure 6:
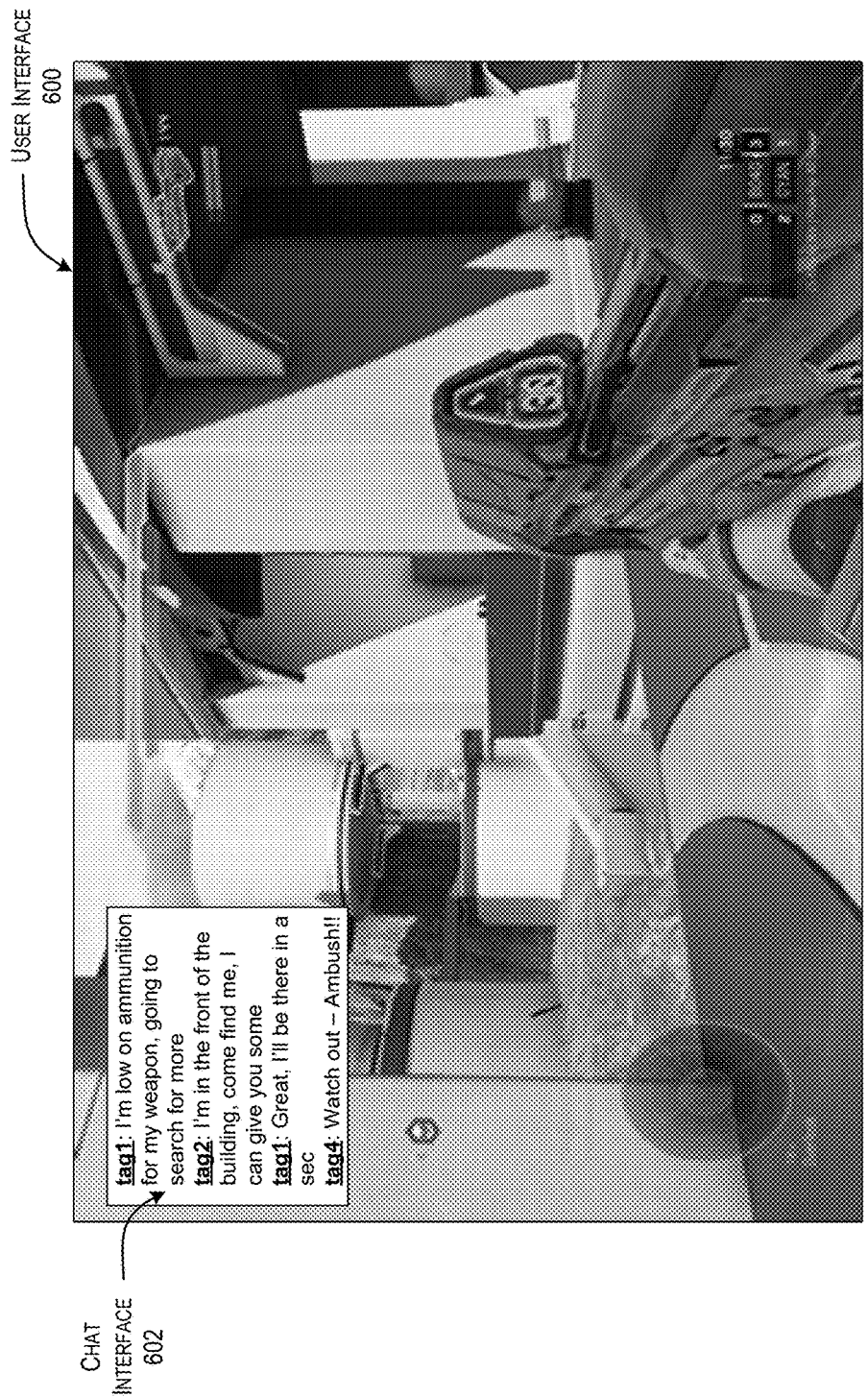
FIG. 6 is another example of a user interface that presents game content along with a chat interface that has moved from a first position (e.g., as shown in FIG. 5) to a second position based on a change in game content being displayed.

FIG. 6 is another example of a user interface 600 that presents a chat interface 602 that has moved from a first position (e.g., bottom right position 410 as shown in FIG. 5) to a second position (e.g., top left position 402) based on a change in game content being displayed. That is, the menu options are no longer being displayed, and the updated game content now displayed in the old position (e.g., bottom right position 410) is likely relevant content that should not be obstructed (e.g., the player's gun and corresponding details). Accordingly, the chat display module 328 is configured to update the focus area for the participant based on updated game content being displayed (as it changes over time) and subsequently select a new, different position (e.g., top left position 402) for the chat interface 602 within the overlay layer 400 so the conversation between the gamer tags can be carried on.

In some examples, the user may be enabled to interact with the chat interface and manually re-position the chat interface if it is obstructing a view of game content the user wants to interact with.

Figure 7:
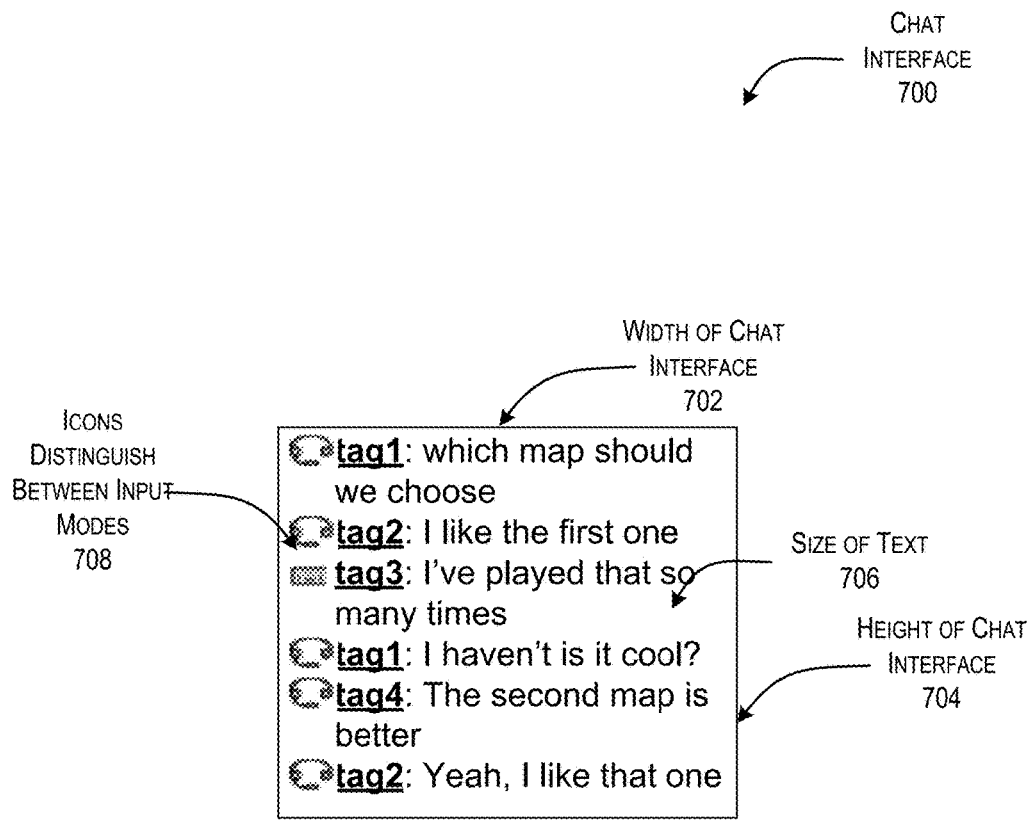
FIG. 7 illustrates example characteristics of a chat interface.

FIG. 7 illustrates example characteristics of a chat interface 700. In various examples, dimension of the chat interface such as the width 702 and the height 704 are preset by the display chat module 328 and cannot be altered by the user (e.g., a predetermined size for positions in the overlay layer 400). However, in alternative examples, a user can define the dimensions, within preset limits, of the chat interface so that the amount of obstruction can be adjusted based on user preference (e.g., a smaller size to limit the amount of obstruction and a larger size to make the messages easier to read at the expense of more obstruction). Furthermore, a user can define a size of the text 706 and/or whether icons that visually distinguish between input modes 708 are to be displayed alongside the messages. For example, earphones and a microphone can be an icon that is displayed next to individual messages that have been converted from speech to text (e.g., the messages from "tag1", "tag2", and "tag4") and a keyboard can be an icon that is displayed next to other messages (e.g., the message from "tag3") that were originally input as text and that have not been converted from speech to text. As described above, the user may be allowed to define these characteristics of the chat interface 700 in the STT conversion settings 318.

FIGS. 8-11 represent example processes in accordance with various examples from the description of FIGS. 8-11. The example operations shown in FIGS. 8-11 can be implemented on or otherwise embodied in one or more of the various devices described herein. Components and/or modules of the devices described herein can carry out operation(s) of the example processes.

The order in which the operations are described in each example flow diagram is not intended to be construed as a limitation, and any number of the described operations can be combined in any order and/or in parallel to implement each process. Moreover, the operations in each of FIGS. 8-11 can be implemented in hardware, software, and/or a combination thereof. In the context of software, the operations represent computer-executable instructions that, when executed by one or more processing units, cause one or more processing units to perform the recited operations. For example, modules and other components described herein can be stored in a computer-readable media and executed by at least one processing unit to perform the described operations. In the context of hardware, the operations can represent logic functions implemented in circuitry (e.g., datapath-control and finite-state-machine sequencing functions).

Figure 8:
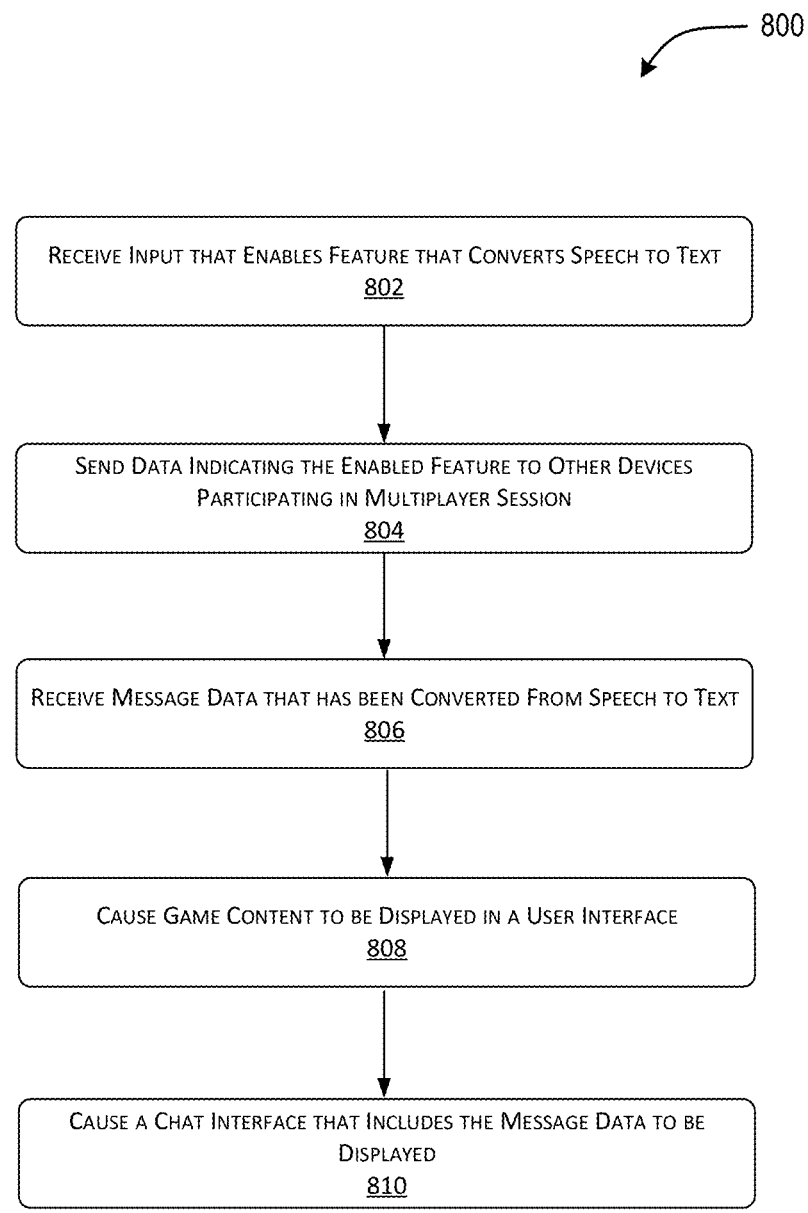
FIG. 8 is a flow diagram of an example method for enabling a feature that converts speech to text and subsequently receiving text messages to be displayed in addition to or rather than receiving voice communications.

FIG. 8 is a flow diagram of an example method 800 for enabling a feature that converts speech to text and for subsequently receiving textual messages to be displayed in addition to or rather than receiving voice communications. In various examples, some or all of the operations of the example method 800 are implemented by a client computing device (e.g., 102(1)) associated with a user that is unable to hear, or that is incapable of hearing.

At 802, input that enables a feature that converts speech to text is enabled. For example, a user with a hearing impairment may enable the feature for a multiplayer session on his or her own device.

At 804, data indicating the enabled feature is sent to other devices participating in the multiplayer session so the other devices are aware that message data that has been converted to text is to be sent in addition to or instead of voice communications (e.g., as part of an in-session voice chat functionality).

At 806, message data that has been converted from speech to text is received.

At 808, game content is caused to be displayed in a user interface. As described above, the game content is rendered by a title (e.g., program code of a title).

At 810, a chat interface is caused to be displayed, the chat interface including chat content (e.g., the message data that has been converted from speech to text). In various examples, the chat interface can be displayed in a selected position of an overlay layer. The position can be selected by a platform component (e.g., the chat display module) of a device without input from or interaction with the program code of the title. Or alternatively, the position can be selected by the title. For instance, the gaming module, via the use of an API, can notify the title of a received message and enable the title to select the position within the overlay layer. Consequently, a selection of a position can be received from the title and the chat interface can be displayed in the position selected.

In other examples, the gaming module, via the use of an API, can notify the title of a received message and the title can include program code to embed a custom chat interface within the game content.

Figure 9:
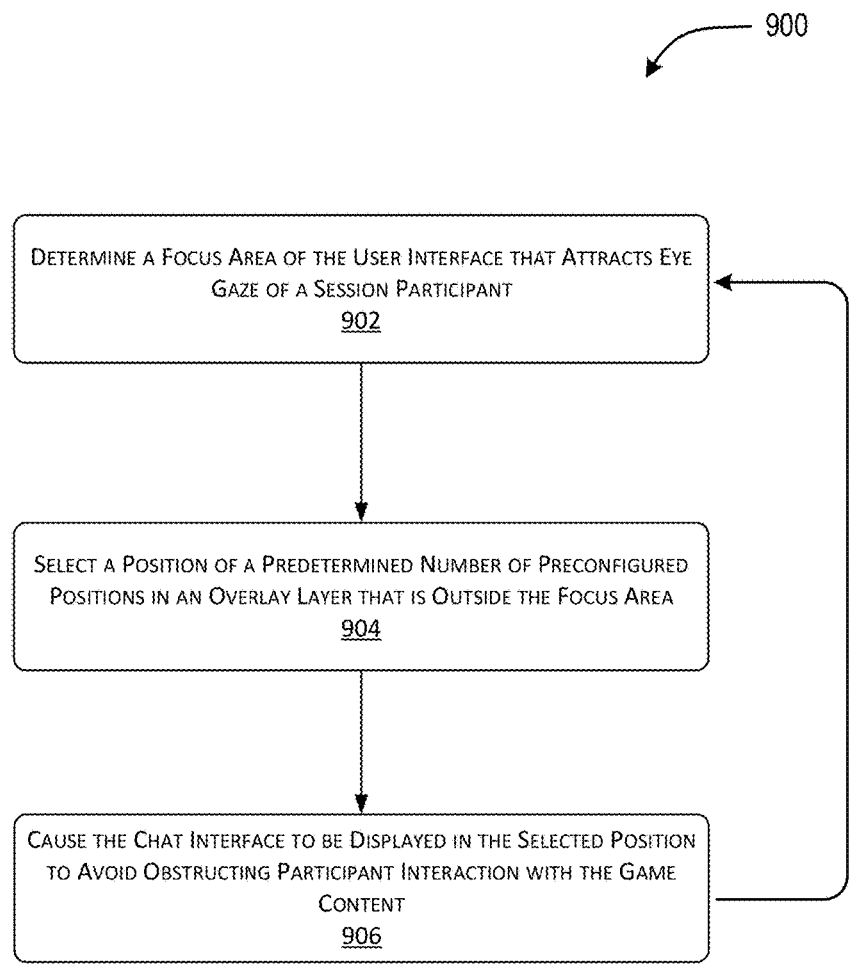
FIG. 9 is a flow diagram of an example method for selecting a position to display the chat interface based on a focus area associated with the user's eye gaze.

FIG. 9 is a flow diagram of an example method 900 for selecting a position to display the chat interface based on a focus area associated with the user's eye gaze. In various examples, some or all of the operations of the example method 900 are implemented by a client computing device (e.g., 102(1)) associated with a user that is unable to hear or that is incapable of hearing. The selection can be made by a platform component (e.g., the gaming module) of a device without input from a title.

At 902, a focus area of the user interface that attracts an eye gaze of a session participant is determined.

At 904, a position is selected from a predetermined number of preconfigured positions in an overlay layer, the position selected being outside the focus area. In one example, the position selected can be determined to contain the least relevant game content, and therefore, obstruction of such content due to the chat interface will have a lessened impact on a gaming experience.

At 906, the chat interface is caused to be displayed in the selected position to avoid obstructing participant interaction with the game content being displayed (e.g., the more relevant game content).

This process can be repeated as the multiplayer session evolves through various stages and/or as game content being displayed changes over a period of time.

Figure 10:
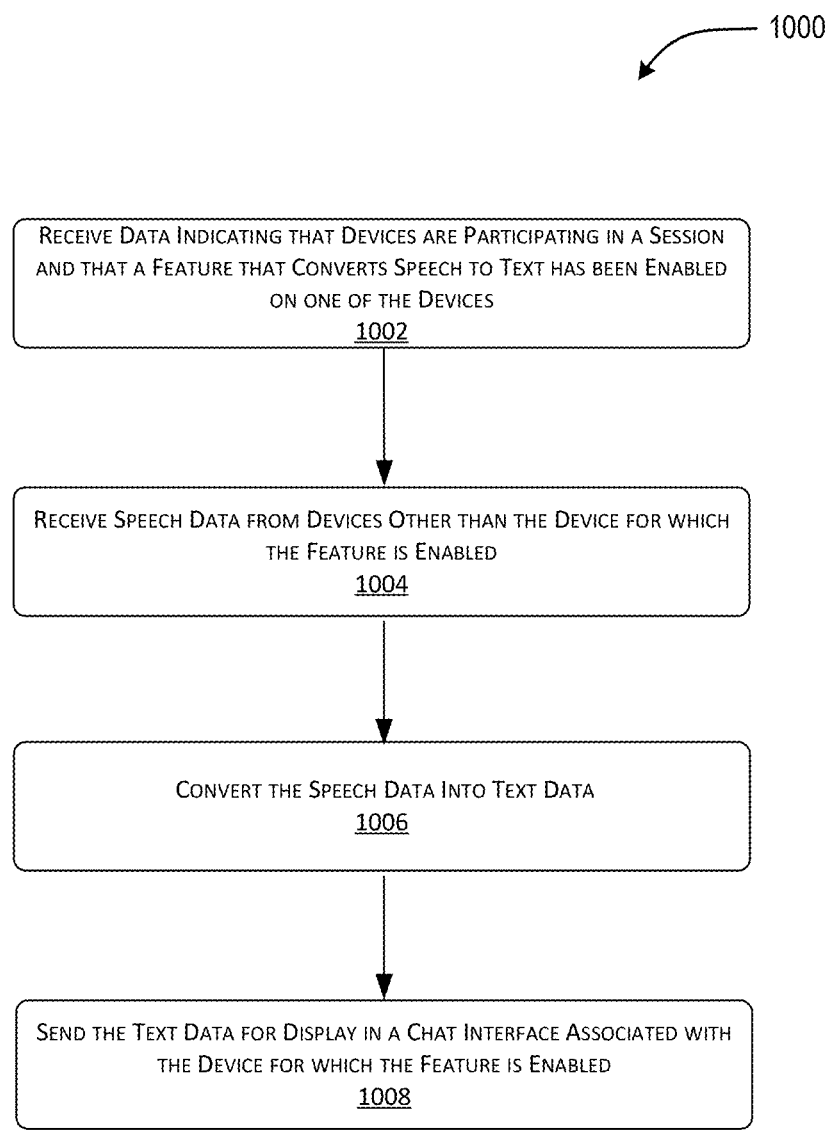
FIG. 10 is a flow diagram of an example method for converting speech data into text so that text messages can be displayed in a chat interface.

FIG. 10 is a flow diagram of an example method 1000 for converting received speech data into text so that text messages can be displayed in a chat interface. In various examples, some or all of the operations of the example method 1000 are implemented by a speech-to-text conversion device (e.g., 112 or 202).

At 1002, data indicating that devices are participating in a session and that a feature that converts speech to text has been enabled on one of the devices.

At 1004, speech data is received from devices other than the device for which the feature is enabled.

At 1006, the speech data is converted into text data. In various examples, a conversion model and/or a dictionary specific to a particular title can be used transcribe the speech data in a more efficient manner.

At 1008, the text data is sent for display in a chat interface associated with the device for which the feature is enabled.

Figure 11:
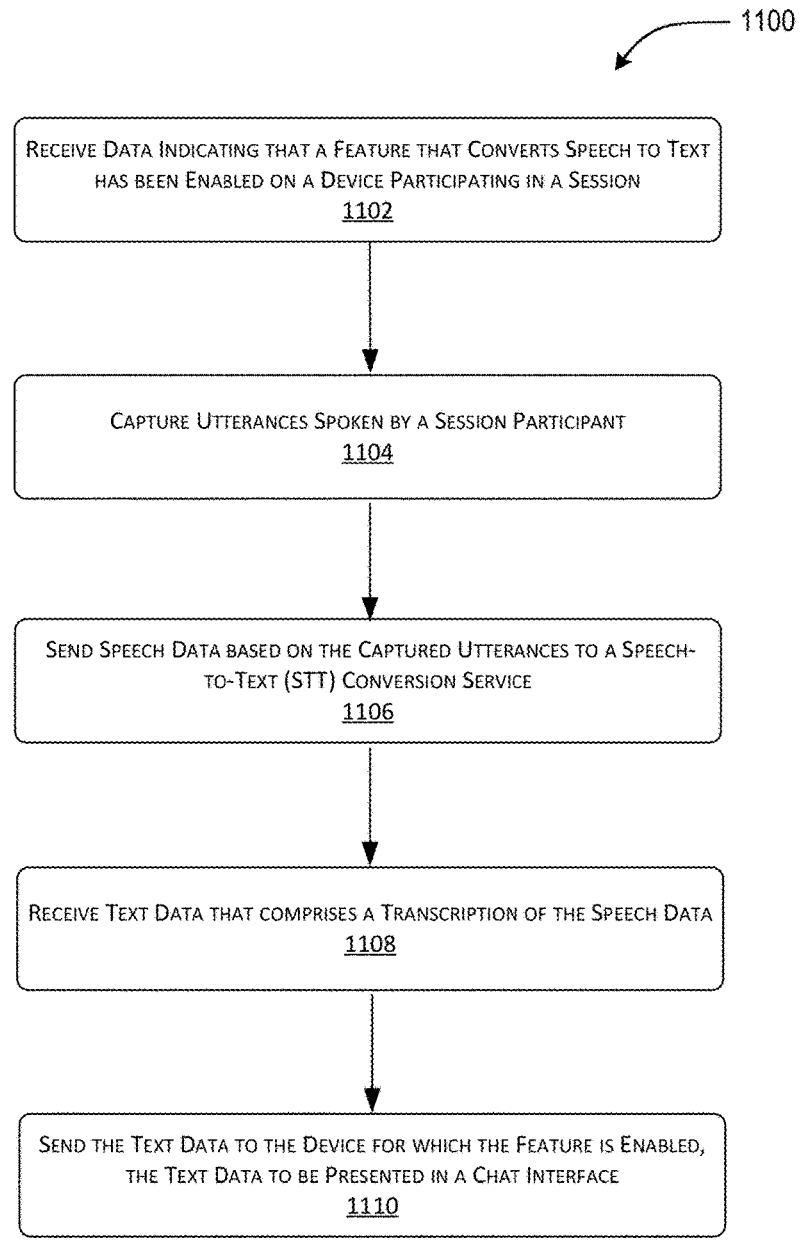
FIG. 11 is a flow diagram of an example method for capturing utterances and sending corresponding speech data to a speech to text conversion service.

FIG. 11 is a flow diagram of an example method 1100 for capturing utterances and sending corresponding speech data to a speech to text conversion service. In various examples, some or all of the operations of the example method 1100 are implemented by a client computing device (e.g., 102(2) . . . 102(N)) participating in a multiplayer session with a device for which the speech-to-text conversion feature is enabled.

At 1102, data indicating that a feature that converts speech to text has been enabled on a device participating in a multiplayer session.

At 1104, utterances spoken by a session participant are captured.

At 1106, speech data based on the captured utterances are sent to a speech-to-text (STT) conversion service.

At 1108, text data that comprises a transcription of the speech data is received from the STT conversion service.

At 1110, the text data is sent to the device for which the feature is enabled so that it can be presented in a chat interface.

As described above, to protect user privacy (e.g., a participant with a hearing impairment), information related to the performance of some or all of these background operations in the example method 1100 may not be known to the user of the device. In other words, no such information is explicitly output (e.g., displayed) to make the user aware of another's user disability that needs or wants accommodation.

The disclosure presented herein may be considered in view of the following example clauses.

Example Clause A, a device for displaying text message data that has been converted from speech to text within a session, the device comprising: one or more processing units; and a computer-readable medium having encoded thereon computer-executable instructions to configure the one or more processing units to: receive input that enables a feature that converts speech to text; send data indicating that the feature has been enabled to other devices participating in the session; receive, based at least in part on the enabled feature, the text message data that has been converted from speech to text; and cause session content of the session to be displayed in a user interface on a display screen associated with the device, the session content including a chat interface that includes chat content associated with the received text message data and game content.

Example Clause B, the device of Example Clause A, wherein the game content is rendered by a title and the chat content is rendered by a platform component of the device, the instructions further configuring the one or more processing units to render the chat interface as an overlay layer on top of the game content displayed in the user interface on the display screen.

Example Clause C, the device of Example Clause B, wherein the instructions further configure the one or more processing units to: determine, based at least in part on the game content displayed in the user interface, a focus area of the user interface associated with an eye gaze of a session participant, a size of the focus area being less than a size of the user interface; select a position for the chat interface within the overlay layer that is outside the focus area; and cause the chat interface to be displayed in the position selected to avoid obstructing participant interaction with the game content.

Example Clause D, the device of Example Clause C, wherein the position selected is one of a predetermined number of preconfigured positions.

Example Clause E, the device of Example Clause C or Example Clause D, wherein the instructions further configure the one or more processing units to: update, based at least in part on updated game content displayed in the user interface at a later time, the focus area of the user interface associated with the eye gaze of the session participant; select another position for the chat interface within the overlay layer that is outside the updated focus area; and cause the chat interface to be displayed in the other position selected to avoid obstructing participant interaction with the updated game content.

Example Clause F, the device of Example Clause B, wherein the instructions further configure the one or more processing units to: notify the title of reception of the text message data; enable the title to select a position for the chat interface within the overlay layer; receive, from the title, a selection of the position for the chat interface within the overlay layer; and cause the chat interface to be displayed in the position selected to avoid obstructing participant interaction with the game content.

Example Clause G, the device of Example Clause A, wherein the instructions further configure the one or more processing units to notify a title of reception of the text message data, the game content and the chat content both being rendered by the title such that the chat interface is embedded within the game content.

Example Clause H, the device of any one of Example Clauses A through G, wherein the other devices are prohibited from outputting information related to the enabled feature to session participants of the other devices.

Example Clause I, the device of any one of Example Clauses A through H, wherein the instructions further configure the one or more processing units to visually distinguish, in the chat interface using icons, between individual text messages that have been converted from speech to text and one or more other messages that were originally input as text and that have not been converted from speech to text.

Example Clause J, the device of any one of Example Clauses A through I, wherein the instructions further configure the one or more processing units to: determine that no communication activity has occurred for a predetermined inactivity time period; and remove the chat interface from the user interface based at least in part on the determining that no communication activity has occurred for the predetermined inactivity time period.

Example Clause K, the device of any one of Example Clauses A through J, wherein the instructions further configure the one or more processing units to format the chat interface so that participant interaction is prohibited.

While the subject matter of Example Clauses A through J is described above with respect to a device, it is understood that the subject matter of Example Clauses A through J can also be implemented via computer-readable storage media and/or as a method.

Example Clause L, a device for converting speech to text within a session, the device comprising: one or more processing units; and a computer-readable medium having encoded thereon computer-executable instructions to configure the one or more processing units to: receive data indicating that a plurality of devices are participating in the session and that a feature that converts speech to text has been enabled on a first device of the plurality of devices; receive, from individual ones of the plurality of devices other than the first device, speech data; and convert the speech data into text message data to be presented in a chat interface on a display screen associated with the first device.

Example Clause M, the device of Example Clause L, wherein the instructions further configure the one or more processing units to send individual instances of the text message data back to the individual device from which the corresponding speech data was received for the individual device to send the individual instances of the message data to the first device.

Example Clause N, the device of Example Clause L, wherein the instructions further configure the one or more processing units to send the text message data directly to the first device subsequent to conversion.

Example Clause O, the device of any one of Example Clauses L through N, wherein the instructions further configure the one or more processing units to: determine a title of the session; access a conversion model that includes a dictionary of words and/or phrases commonly spoken by session participants while participating in the title of the session; and use the conversion model to convert the speech data into the text message data.

Example Clause P, the device of Example Clause O, wherein the instructions further configure the one or more processing units to use machine learning techniques to update the conversion model based on the speech data being converted into the text message data.

Example Clause Q, the device of any one of Example Clauses L through P, wherein the chat interface comprises an overlay layer rendered by a platform component on top of game content.

Example Clause R, the device of Example Clause Q, wherein the chat interface is rendered in a position selected from a predetermined number of preconfigured positions in the overlay layer.

While the subject matter of Example Clauses L through R is described above with respect to a device, it is understood that the subject matter of Example Clauses L through R can also be implemented by a system, via computer-readable storage media, and/or as a method.

Example Clause S, a device for enabling speech to be converted to text within a session, the device comprising: one or more processing units; and a computer-readable medium having encoded thereon computer-executable instructions to configure the one or more processing units to: receive data indicating that a feature that converts speech to text has been enabled on another device participating in the session; capture utterances spoken by a session participant using the device to participate in the session; send speech data based on the captured utterances to a speech-to-text (STT) conversion service; receive, from the STT conversion service, text message data that comprises a transcription of the speech data; and send the text message data to the other device for rendering in a chat interface associated with game content being displayed in a user interface on a display screen.

Example Clause T, the device of Example Clause S, wherein the instructions further configure the one or more processing units to prohibit the device from displaying information related to performance of: the receiving the data indicating that the feature has been enabled, the sending the speech data based on the captured utterances to the STT conversion service, the receiving the text message data that comprises the transcription of the speech data, and the sending the text message data to the other device.

While the subject matter of Example Clauses S and T is described above with respect to a device, it is understood that the subject matter of Example Clauses S and T can also be implemented via computer-readable storage media and/or as a method.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A device for displaying text message data that has been converted from speech to text within a session, the device comprising:
    one or more processing units; and
    a computer-readable medium having encoded thereon computer-executable instructions to configure the one or more processing units to:
        receive input that enables a feature that converts speech to text;
        send data indicating that the feature has been enabled to other devices participating in the session;
        receive, based at least in part on the enabled feature, the text message data that has been converted from speech to text;
        cause session content of the session to be displayed in a user interface on a display screen associated with the device, the session content including a chat interface that includes chat content that is rendered by a platform component of the device and game content that is rendered by a title, wherein the chat content is associated with the received text message data and the chat interface is rendered as an overlay layer on top of the game content;
        determine, based at least in part on the game content displayed in the user interface, a focus area of the user interface, a size of the focus area being less than a size of the user interface;
        select a position for the chat interface within the overlay layer that is outside the focus area; and
        cause the chat interface to be displayed in the position selected to avoid obstructing participant interaction with the game content.

2. The device of claim 1, wherein the focus area of the user interface is further determined based on an eye gaze of a session participant.

3. The device of claim 1, wherein the position selected is one of a predetermined number of preconfigured positions.

4. The device of claim 1, wherein the instructions further configure the one or more processing units to:
    update, based at least in part on updated game content displayed in the user interface at a later time, the focus area of the user interface;

select another position for the chat interface within the overlay layer that is outside the updated focus area; and cause the chat interface to be displayed in the other position selected to avoid obstructing participant interaction with the updated game content.

5. The device of claim 1, wherein the instructions further configure the one or more processing units to:

notify the title of reception of the text message data;

enable the title to select the position for the chat interface within the overlay layer; and receive, from the title, a selection of the position for the chat interface within the overlay layer.

6. The device of claim 1, wherein the other devices are prohibited from outputting information related to the enabled feature to session participants of the other devices.

7. The device of claim 1, wherein the instructions further configure the one or more processing units to visually distinguish, in the chat interface using icons, between individual text messages that have been converted from speech to text and one or more other messages that were originally input as text and that have not been converted from speech to text.

8. The device of claim 1, wherein the instructions further configure the one or more processing units to:

determine that no communication activity has occurred for a predetermined inactivity time period; and remove the chat interface from the user interface based at least in part on the determining that no communication activity has occurred for the predetermined inactivity time period.

9. The device of claim 1, wherein the instructions further configure the one or more processing units to format the chat interface so that participant interaction is prohibited.

10. A method comprising:

receiving, at a device, input that enables a feature that converts speech to text;

sending data indicating that the feature has been enabled to other devices participating in a session;

receiving, based at least in part on the enabled feature, a text message data that has been converted from speech to text;

causing, by one or more processing units, session content of the session to be displayed in a user interface on a display screen associated with the device, the session content including a chat interface that includes chat content that is rendered by a platform component of the device and game content that is rendered by a title, wherein the chat content is associated with the received text message data and the chat interface is rendered as an overlay layer on top of the game content;

determining, based at least in part on the game content displayed in the user interface, a focus area of the user interface, a size of the focus area being less than a size of the user interface;

selecting a position for the chat interface within the overlay layer that is outside the focus area; and causing the chat interface to be displayed in the position selected to avoid obstructing participant interaction with the game content.

11. The method of claim 10, wherein the focus area of the user interface is further determined based on an eye gaze of a session participant.

12. The method of claim 10, wherein the position selected is one of a predetermined number of preconfigured positions.

13. The method of claim 10, further comprising:

updating, based at least in part on updated game content displayed in the user interface at a later time, the focus area of the user interface;

selecting another position for the chat interface within the overlay layer that is outside the updated focus area; and causing the chat interface to be displayed in the other position selected to avoid obstructing participant interaction with the updated game content.

14. The method of claim 10, further comprising:

notifying the title of reception of the text message data;

enabling the title to select the position for the chat interface within the overlay layer; and receiving, from the title, a selection of the position for the chat interface within the overlay layer.

15. The method of claim 10, wherein the other devices are prohibited from outputting information related to the enabled feature to session participants of the other devices.

16. The method of claim 10, further comprising visually distinguishing, in the chat interface using icons, between individual text messages that have been converted from speech to text and one or more other messages that were originally input as text and that have not been converted from speech to text.

17. The method of claim 10, further comprising:

determining that no communication activity has occurred for a predetermined inactivity time period; and removing the chat interface from the user interface based at least in part on the determining that no communication activity has occurred for the predetermined inactivity time period.

18. The method of claim 10, further comprising formatting the chat interface so that participant interaction is prohibited.

19. One or more computer storage media storing instructions that, when executed by one or more processing units, cause a device to perform operations comprising:

receiving input that enables a feature that converts speech to text;

sending data indicating that the feature has been enabled to other devices participating in a session;

receiving, based at least in part on the enabled feature, a text message data that has been converted from speech to text;

causing session content of the session to be displayed in a user interface on a display screen associated with the device, the session content including a chat interface that includes chat content that is rendered by a platform component of the device and game content that is rendered by a title, wherein the chat content is associated with the received text message data and the chat interface is rendered as an overlay layer on top of the game content;

determining, based at least in part on the game content displayed in the user interface, a focus area of the user interface, a size of the focus area being less than a size of the user interface;

selecting a position for the chat interface within the overlay layer that is outside the focus area; and causing the chat interface to be displayed in the position selected to avoid obstructing participant interaction with the game content.

20. The one or more computer storage media of claim 19, wherein the position selected is one of a predetermined number of preconfigured positions.

* * * * *